(12) United States Patent
Xu et al.

(10) Patent No.: US 8,144,726 B2
(45) Date of Patent: *Mar. 27, 2012

(54) STRUCTURE FOR OUT OF BAND SIGNALING ENHANCEMENT FOR HIGH SPEED SERIAL DRIVER

(75) Inventors: Huihao Xu, Brooklyn, NY (US); Joseph Natonio, Wappingers Falls, NY (US); James D. Rockrohr, Hopewell Junction, NY (US); Michael A. Sorna, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 974 days.

This patent is subject to a terminal disclaimer.

(21) Appl. No.: 12/154,796

(22) Filed: May 27, 2008

(65) Prior Publication Data

US 2009/0300562 A1     Dec. 3, 2009

(51) Int. Cl.
*H04L 12/43* (2006.01)
*G06F 17/50* (2006.01)

(52) U.S. Cl. ........ 370/459; 370/236; 370/311; 716/106; 716/111

(58) Field of Classification Search .................. 716/106, 716/111; 370/236, 311, 459
See application file for complete search history.

(56) References Cited

U.S. PATENT DOCUMENTS

| | | | | |
|---|---|---|---|---|
| 5,229,664 | A * | 7/1993 | Brehmer | 327/553 |
| 7,372,302 | B1 * | 5/2008 | Ohshima et al. | 326/82 |
| 2003/0158991 | A1 | 8/2003 | Deyring et al. | |
| 2008/0304509 | A1 * | 12/2008 | Xu et al. | 370/459 |
| 2009/0164961 | A1 * | 6/2009 | Goss et al. | 716/11 |

* cited by examiner

*Primary Examiner* — Jack Chiang
*Assistant Examiner* — Patrick Sandoval
(74) *Attorney, Agent, or Firm* — Yuanmin Cai; Daryl K. Neff

(57) ABSTRACT

A design structure is provided for a microelectronic serial driver. The serial driver is operable to transmit a differential pattern signal during a burst interval and a predetermined common mode voltage level during a second interval between adjacent burst intervals, the serial driver including at least one pre-driver and a driver coupled to an output of the pre-driver for transmitting the differential communication signal. A switching circuit is operable to switch the serial driver between a first power supply voltage level for the burst interval and the predetermined common mode voltage level, wherein the predetermined common mode voltage level is independent of variations in power supply voltage conditions and temperature conditions.

15 Claims, 7 Drawing Sheets

STRUCTURE FOR OUT OF BAND SIGNALING ENHANCEMENT FOR HIGH SPEED SERIAL DRIVER

BACKGROUND OF THE INVENTION

1. Field of the Invention

The present invention relates to design structures, such as design structures embodied in a machine-readable medium used in a design process, the design structure including circuits, devices or methods for serial data transmission or microelectronic serial data transmitters.

2. Description of the Related Art

Data communication systems designed to operate at peak data transmission rates of 8.5, 10 or 11.1 gigabits per second ("Gbs") or greater, are fine tuned for data transmission rate at such high transmission rate. Even though the data communication system may need to operate at lower data transmission rates, e.g., 1.5 Gbs to support various protocols such as SATA ("Serial ATA" or "Serial Advanced Technology Attachment") and Serial Attached SCSI ("SAS"), the communication system generally is not optimized for transmission at such lower data transmission rates. To support these lower data rate, i.e., these out-of-band ("OOB") signaling protocols, a communications system is required to perform according to stringent out-of-band ("OOB") signaling specifications. OOB signals are low data rate signal patterns that do not appear in normal data streams. With reference to FIG. 1, OOB signals consist of leaving the output lines of the transmitter idle for idle time intervals 121, 122, 123, 124, 125 and 126 of predetermined length, followed by transmitting a signal pattern during burst intervals 111, 112, 113, 114, 115 and 116, each burst interval having a predetermined length. During the idle time intervals, the physical link between the transmitter and the receiver carries a DC idle voltage, which should equal the long term common mode voltage level of the transmitter during normal operation. During burst time intervals, the signal pattern appears on the physical link, i.e., as differential signals which rapidly transition between high and low levels at high rates, such at a rate of one or more Gbs.

Conventional data transmission systems operating at a data transmission rate of 11.1 Gbs, e.g., for Common Electrical Interconnect ("CEI"), 10 Gbs Infiniband ("IB") or at 8.5 Gbs for Fiber Channel ("FC") may not be able to meet the stringent OOB signaling specifications (for low data transmission rate) without degrading performance of the system at the higher 8.5, 10 or 11.1 Gbs transmission rate. The length of the DC idle time intervals for OOB signaling is predetermined, for example, as a time of 100 ns. Further, the OOB signaling specifications place a maximum limit on the amount of time required for the data communications system to transition between idle time and burst time. The transition between one burst time interval and the DC idle time interval needs to occur quickly to allow sufficient response time for an OOB signal detection circuit at the receiver to detect the transition. Slow transitions between DC idle time or burst time intervals or difficulty in detecting the transitions can cause the length of the DC idle time interval to appear to shrink, leaving less time available for OOB signaling.

The OOB signaling specifications also impose maximum deltas on voltage offset and common mode voltage for out-of-band operation. Referring to FIG. 2, OOB offset delta is the mismatch voltage offset between the final outputs of the P and N legs of a differential data transmitter. With a differential data transmitter outputting a differential pair of signals, one signal 140 of the pair of differential signals on the P leg, and another signal 142 of the pair of differential signals on the N leg, when the OOB offset delta is high, the output 142 of the N leg may appear to dip lower than the output 140 of the P leg and the output 142 of the N leg may not rise as much as the output 140 of the P leg. Alternatively, the output 140 of the P leg may appear to dip lower or not rise as high as the output 142 of the N leg. The term OOB common mode voltage delta refers to the difference between the average common mode DC voltage 150 of the signals 140, 142 when the data transmitter is transmitting during burst time intervals and the average common mode DC voltage level 152 during the DC idle time intervals.

Variations in the processing used to make microelectronic transmitters, as well as variations in the operating environment of the transmitter such as temperature or power supply voltage to which it is subjected in operation can cause the common mode voltage level output by the transmitter to vary. These variations can also cause the length of the transition time between DC idle time and burst time to vary. These variations pose additional challenges for meeting the OOB signaling specifications.

Further challenges are posed by the requirement of the OOB signaling specifications for a transmitter to begin OOB signaling quickly upon entering the OOB operational mode. The transmitter can be operating in any one of many different signaling states when it is reset to enter the OOB operational mode. For example, the transmitter can be operated in one of several different feed forward equalization (FFE) modes, be connected with a receiver and operating in AC-coupled mode or DC coupled mode, and can be transmitting with various transmitter output amplitude settings. The transmitter must be designed robustly to be reset from any of such valid transmitting states to the OOB signaling state.

A Fiber Channel protocol transmitter with out-of-band signal transmission capability is described for connection to an SATA bus in U.S. Patent Publication No. 2003/0158991 to Deyring et al. As illustrated in FIG. 3, to enable OOB signal transmission, a DC blocking capacitor 16, 18 having a predetermined value is connected in series with each of the differential signal output lines 12, 14, respectively of a transmitter 10. The conventional Fiber Channel transmitter 10 is modified with a signal generator 28 to transmit a non-data pattern signal 26 containing an unbroken string of either all '1's or an unbroken string of all '0's into a parallel input, serial output shift register at the transmitter input. After some time, the DC blocking capacitors cause the signals representing the unbroken string of '1's or '0's to decay to a long term common mode DC voltage levels at points 20, 22 of the data output lines to output a constant common mode DC voltage level during the DC idle interval. As the OOB signaling transmitter 10 (FIG. 3) relies on DC blocking capacitors to reach the DC level for the DC idle interval, the OOB signaling transmitter is only useful when it is AC coupled to a data transmission channel. Another problem of the prior art OOB signaling transmitter is that it may not meet the requirements for rapid transitioning between the DC idle time interval and the burst time interval. DC blocking capacitors such as the capacitors 16, 18 shown in FIG. 3 generally have capacitance on an order of nanofarads (nF). Given that transmitter internal termination resistance is generally set to 50Ω or possibly 100Ω, as shown in FIG. 3, an RC time constant associated with transitioning from burst state to DC idle state is on the order of about 50 nanoseconds (ns). Fifty nanoseconds transition time is too long to satisfy the quick transition detection requirements of the OOB signaling specification. However, if the amount of DC blocking capacitance is reduced to an amount lower than nanofarads, lower frequency components of the transmitter output can be excessively attenuated, making both OOB and normal data transmission more difficult.

SUMMARY OF THE INVENTION

A design structure is provided for an integrated microelectronic serial driver. Such serial driver is operable to transmit a differential pattern signal during a burst interval and a predetermined common mode voltage level during a second interval between adjacent burst intervals, the serial driver including at least one pre-driver and a driver coupled to an output of the pre-driver for transmitting the differential communication signal. A switching circuit can be used to switch the serial driver between a first power supply voltage level for the burst interval and the predetermined common mode voltage level. Desirably, the predetermined common mode voltage level is independent of variations in power supply voltage conditions and temperature conditions. In a particular embodiment, the predetermined common mode voltage level can be selected in accordance with a plurality of input signals, e.g., as provided to a digital-to-analog current converter or "IDAC". In one embodiment, the design structure can include, for example, a netlist. The design structure may reside on storage medium as a data format used for the exchange of layout data of integrated circuits. In a particular embodiment, the design structure may reside in a programmable gate array.

DETAILED DESCRIPTION

Figure 1:
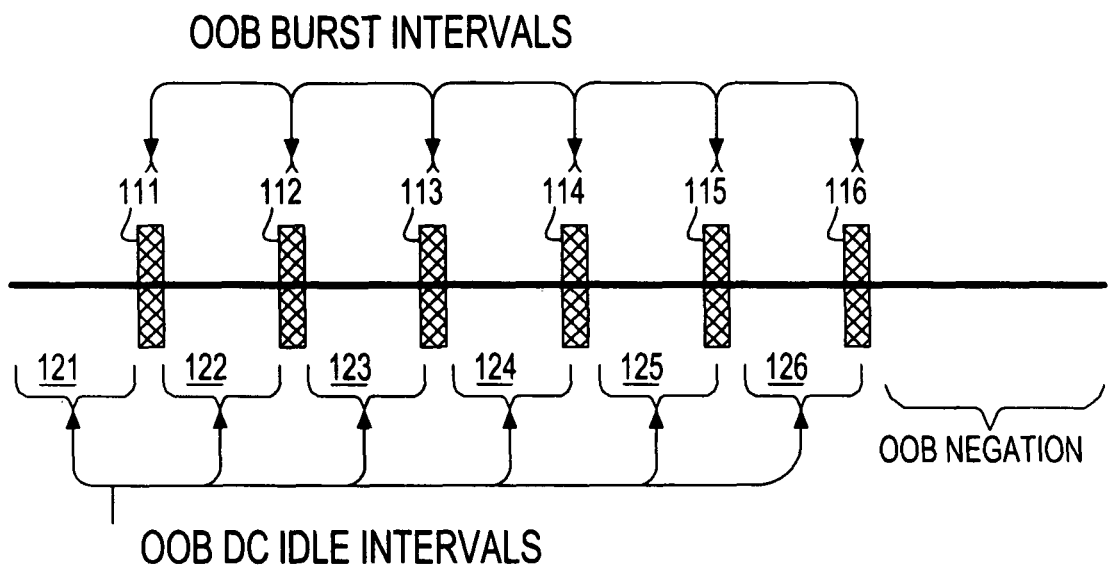
FIG. 1 illustrates an out-of-band signaling method in accordance with the prior art.
Figure 2:
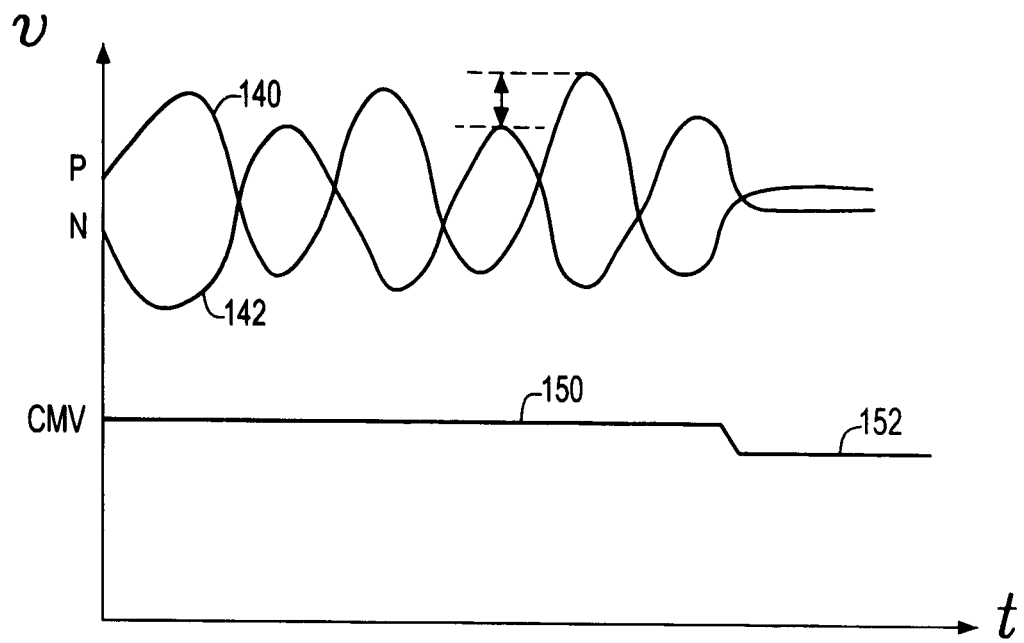
FIG. 2 includes graphs illustrating operation of a serial driver in accordance with the prior art.
Figure 3:
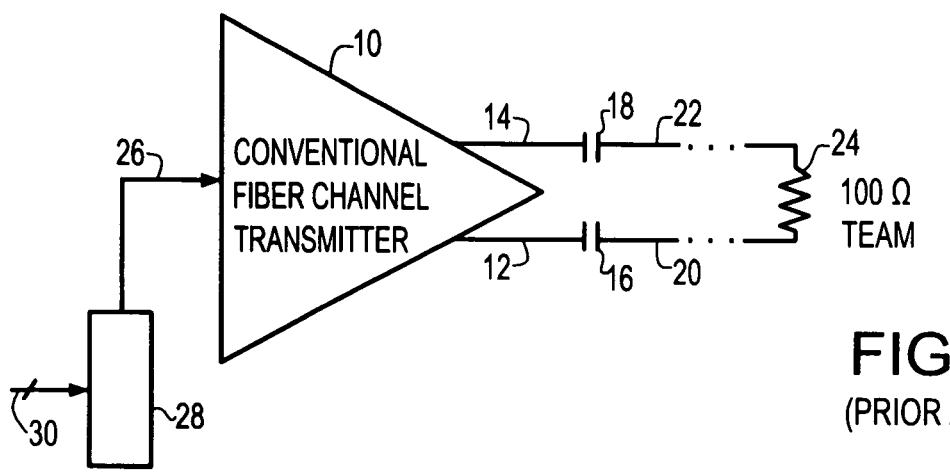
FIG. 3 is a block diagram illustrating a serial driver in accordance with the prior art as shown in U.S. Patent Pub. 2003/0158991.

According to the embodiments of the invention, a system and method are provided for addressing the OOB signal specifications in connection with a high data transmission rate serial transmitter. In accordance with such embodiments, a system and method are provided for avoiding shrinkage in the length of the DC idle time. Through the system and method disclosed herein, the output lines of the transmitter can also be set to a desirable predetermined common mode voltage level. In addition, the system and method disclosed herein can reduce or eliminate offset between the P leg and N leg at the final output stage of the transmitter. In such manner, the system and method disclosed herein can be used to meet the OOB signaling specifications for, for example, SATA and SAS.

In the field of serial data communication, there are various industrial communication standards, such as Common Electrical Interconnect (CEI), Fiber Channel (FC), Infiniband (IB), Serial Attached SCSI (SAS), Serial Advanced Technology Attachment (SATA), and etc. Data communication system designs are driven by meeting one or more than one industrial communication standards. As CMOS process technology advances, data transmission rate advances rapidly beyond 6 Gs, one of the arising challenges is to design a communication system running at blazingly fast data rate to meet high speed industrial standards such as 11 Gbs CEI, 10 Gbs IB and 8.5 Gbs FC, at the same time to be compatible with lower speed communication standards, such as 1.5 Gbps/3.0 Gbps/6.4 Gbps SATA and 1.5 Gbps/3.0 Gbps/6.4 Gbps SAS, without degrading high speed performance by adding extra circuitries to operate at lower speed.

In serial data communication system, serial data transfer normally involves use of a transmit clock which is encoded in the transmitted data. The transmit clock is not transmitted on a separated line. For example, in SATA and SAS, the serial bus only has three lines in each direction, two for a differential signal, and one ground line and there is no separate clock line. This requires that the receiver to recover the clock used by the transmitter to send the data. Usually this is done with a phase lock loop which tracks the embedded clock signal and keeps a local oscillator synchronized to the embedded clock. This phase lock loop has to keep the receiver clock in synchronization with the transmit clock for the bus to work properly. Because constant synchronization must be maintained, the transmitters must constantly transmit data with an embedded clock signal even when they have no data to send. A fill data pattern (which has no meaning) is transmitted when there is no data to send.

When something goes wrong and the receiver has lost synchronization and cannot receive any data, a reset process must be performed to fix whatever problem has occurred and get both transmitter and receiver back into synchronization with each other. This reset process is called out-of-band (OOB) signaling in the context of the SATA or SAS bus protocol. For serial bus transmission protocols other than SATA or SAS, a reset process may need to be performed to re-establish active serial data communication after the bus loses synchronization or when it exits sleep mode. The embodiments of the invention described below can prove useful in each of these cases.

Figure 4:
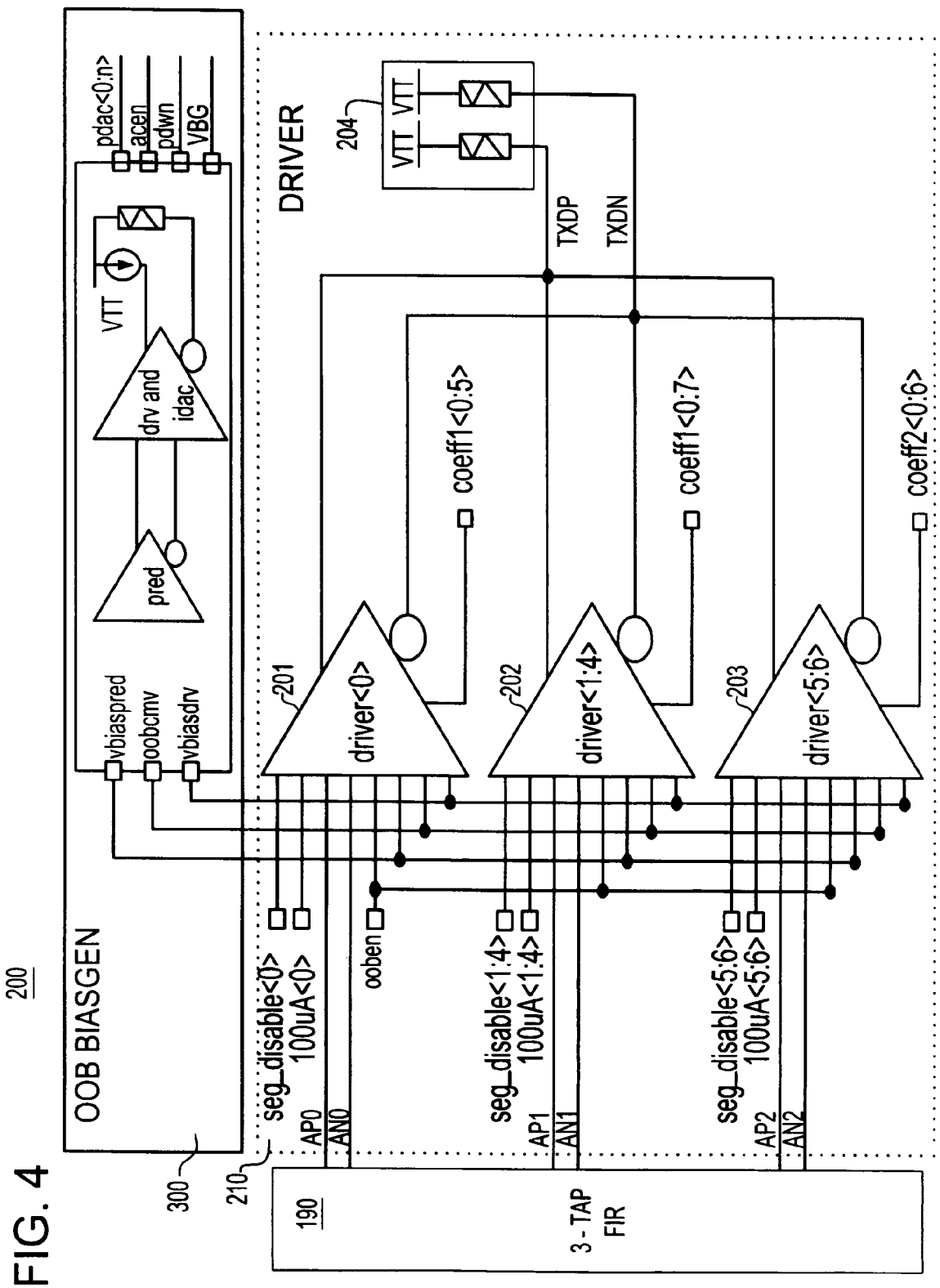
FIG. 4 is a block and schematic diagram illustrating a structure of a serial driver in accordance with an embodiment of the invention.

FIG. 4 is a block and schematic diagram illustrating a high speed differential serial signal driver 200 in accordance with an embodiment of the invention. The signal driver 200 has features which make its operation compatible with the OOB signaling specifications of SATA and SAS. As shown in FIG. 4, the signal driver 200 includes a 3-tap finite impulse response ("FIR") filter 190, a seven segment high speed driver 210, and an out-of-band bias current generator (OOB BIAS-GEN) 300. The high speed driver 210 includes seven parallel small high-speed driver segments including one segment (driver<0>) 201 for receiving a pre-cursor data signal, four segments (driver<1:4> for main-cursor data signals 202 and two segments 203 for post-cursor data signals. An internal termination resistor network 204 is coupled to the outputs TXDP and TXDN of the seven segments which are dotted (combined) together for output, such as at an external bond pad, e.g., C4 pad, of the microelectronic element.

The three tap FIR 190 outputs three parallel serialized high speed differential data signals. The signals AP0 and AN0 define one-bit early data, called pre-cursor data, which is input to the driver<0> segment 201. The signals AP1 and AN1 define one-bit present data, called main cursor data which is input to each of four segments 202, driver<1>, driver<2>, driver<3> and driver<4>. The signal AP2 and AN2 are one-bit delayed data, called post-cursor data which is input to the driver<5> and driver<6> segments 203. Through the combined output of the seven segments, different feed forward equalization (FFE) characteristics can be achieved to counteract various channel attenuation by distributing different amount of tail current among the seven high speed driver segments. The OOB BIASGEN generates tail bias voltages VBIASPRED and VBIASDRV, as well as the long term common mode voltage for all seven small high speed driver segments. Logic control signal OOBEN indicates OOB signaling operation. The signals denoted 100 uA<0:6> in FIG. 4 are band gap voltages based proportional to resistor current sources. Logic control signals seg_disable<0:6> are to enable or disable seven small high speed driver segments for various FFE operations. Logic control signal PDAC<0:n> is used to set the output amplitude of the driver 210. Logic control signal ACEN indicates whether the transmitter is in AC-coupled mode or DC-coupled mode. VBG is the band gap voltage. Logic control signals coeff0<0:5>, coeff1<0:7>, and coeff2<0:6> are settings for a current controlled digital analog converter or "IDAC" which are applied to the final high speed driver stage 210 of the serial driver 200.

Figure 5:
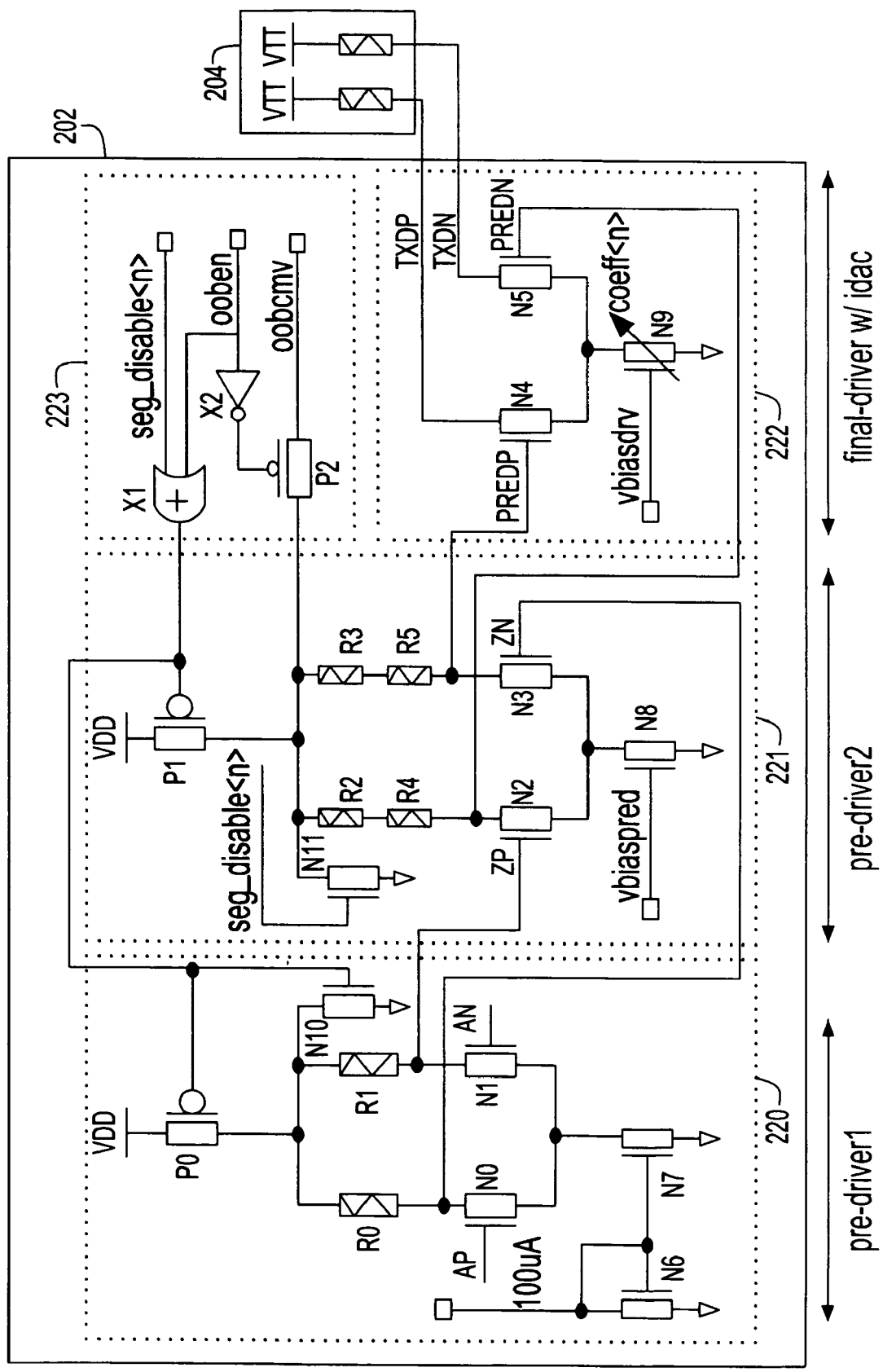
FIG. 5 is a schematic diagram illustrating a circuit-level implementation of a serial driver in accordance with an embodiment of the invention.

FIG. 5 is a schematic diagram illustrating an implementation of one segment, e.g., segment 202 of the driver segment 210. The segment includes a combinatorial logic unit 223 and three CML stages: a pre-driver1 (220), a pre-driver2 (221), and a final-driver 222. The final-driver 222 includes an IDAC to which multiple bit coefficients are input which control a transmission characteristic of the driver 200. Tail bias current VBIASDRV for the final-driver 222 and tail bias current VBIASPRED for the pre-driver-2 (221) are provided in amounts by the OOB BIASGEN (300; FIG. 4) in such way that the pre-driver2 (221) obtains just high enough amplitude swing to fully switch the final-driver 222. The common mode voltage OOBCMV which is input to the pre-driver2 (221) through transistor P2 is received from the OOB BIASGEN 300 (FIG. 4).

In operation, during normal high-speed data transmission operation or an OOB signaling burst time interval in which the logic signal OOBEN is at a low voltage level (disabled) and the seg_disable<n> signal is at a low voltage level (OFF), transistor P0 of pre-driver1 (220) and transistor P1 of pre-driver2 (221) are turned on. Transistor N10 of pre-driver1 (220), transistor N11 of pre-driver2 (221) and transistor P2 are off at that time, so that regular serialized data AP and AN propagate through pre-driver1, pre-driver2, the final-driver, and then as the outputs TXDP and TXDN to the final bond pads (or C4 pads) of the microelectronic element.

During the OOB signaling DC idle time in which the logic signal OOBEN is at a high level (enabled) and seg_disable<n> is low, transistor P0 is turned off and transistor N10 is turned on. In such case, both of the internal signals ZP and ZN are pulled to ground, regardless of the state of the regular serialized data AP and AN. Moreover, at that time, transistor P1 is turned off, transistor N11 is turned off and transistor P2 is turned on to receive the OOBCMV bias voltage. As a result, the internal bias signals PREDP and PREDN then are set to the OOBCMV bias voltage. Because OOBCMV is the correct long term common mode voltage of the real pre-driver2 (221), PREDP and PREDN bias the final-driver outputs TXDP and TXDN at their correct long term common mode voltage. In this way, the correct long term common mode voltage of the real pre-driver2 (221) is directly applied to the input of the final-driver 222. Any variation in the operation of the final-driver due to variability of the fabrication process or variations in the operating temperature and voltage of the serial driver 200 (FIG. 4) is limited only to effects brought about by the operation of the final-driver 222 stage rather than in the preceding pre-driver1 and pre-driver2 CML stages. In addition, because during the OOB signaling DC idle time the pre-driver1 (220) is turned off, coupling noise arriving from the outputs ZN and ZP of the pre-driver1 (220), such as from the regular serialized data is reduced or eliminated.

Coupling noise usually is a big concern for meeting OOB signaling specifications because a little coupling noise at an earlier stage of the driver can be amplified through subsequent high-gain CML stages. When seg_disable<n>=High, transistor P0 is turned off. The pre-driver1 (220) then is disabled and its outputs ZP and ZN are pulled down to ground. Similarly, when seg_disable<n>=High, transistor P1 is turned off, transistor N11 is turned on, the pre-driver2 (221) is disabled and its outputs PREDP and PREDN then are pulled down to ground.

As the pre-driver outputs PREDP and PREDN are at ground and applied to the gates of transistors N4 and N5, respectively, the final driver outputs TXDP and TXDN are disabled. Under these conditions, gate dielectrics of transistors N4 and N5 will be subjected to voltages of VTT minus ground, which may reach 1.8 V or more. The gate dielectric may also be thin in smaller size transistors of advanced or future technology generations. In such cases, the gate to source voltage may exceed the tolerance of the transistors N4 and N5 and lead to their diminished reliability. To address this concern, the source of transistor N11 can be connected to a voltage higher than ground, such as a voltage of ⅓×VTT. Such voltage should be high enough to relieve stress on the gate dielectrics of transistors N4 and N5 and low enough to avoid turning the transistors N4 and N5 on when the seg_disable<n> signal is active to disable the pre-driver2 and the final driver, in turn.

Figure 6:
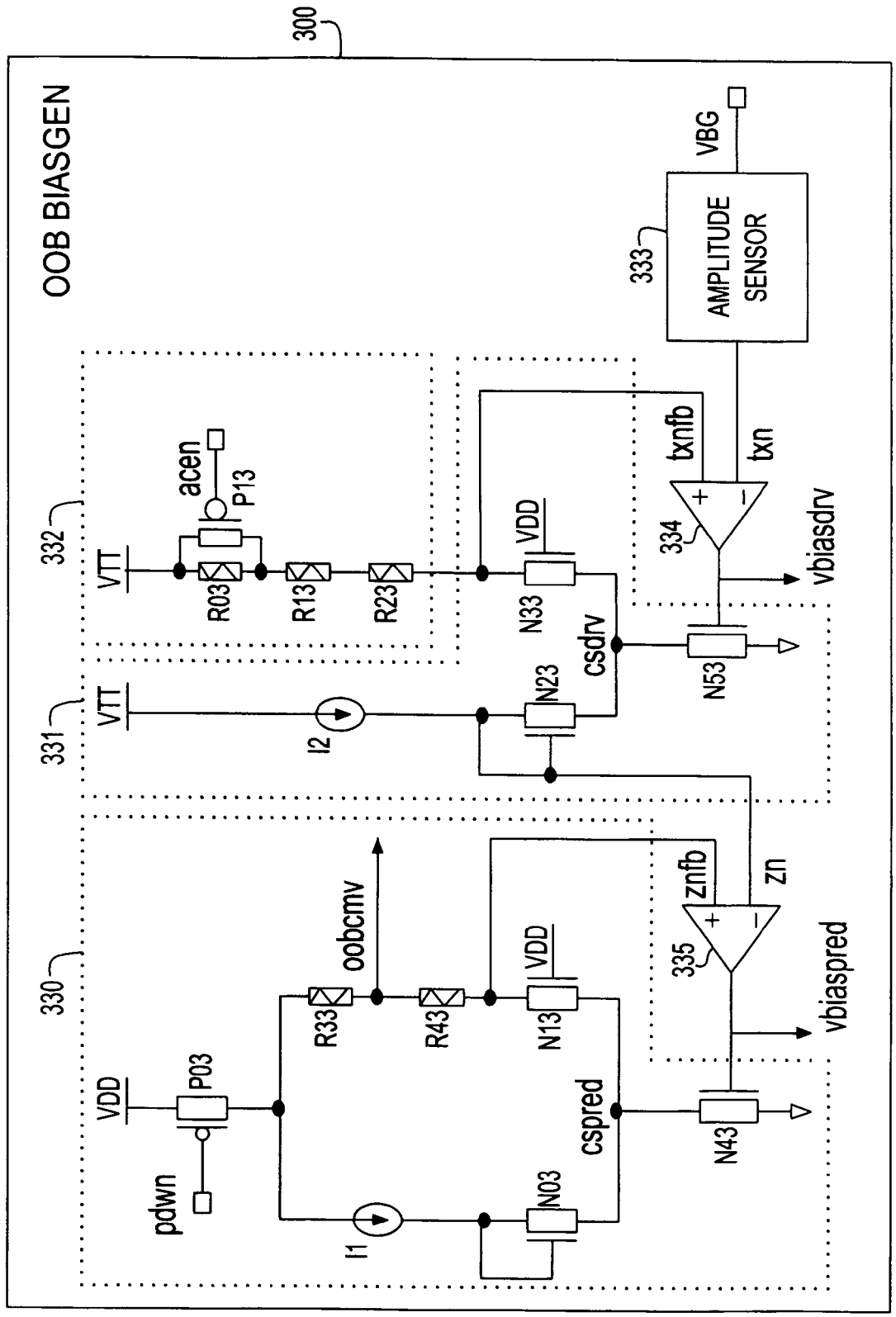
FIG. 6 is a schematic diagram illustrating a circuit-level implementation of an out-of-band bias generator (OOB BIASGEN) circuit of a serial driver in accordance with an embodiment of the invention.

FIG. 6 is a schematic diagram illustrating an implementation of the OOB BIASGEN 300 (FIG. 4). The OOB BIASGEN includes a transmitter output amplitude sensor 333 and a modified duplicate circuit 332 mimicking a structure and operation of the termination resistor network 204. Also included in the OOB BIASGEN are a modified duplicate circuit 331 mimicking a structure and operation of the final-driver 222 (FIG. 5), a modified duplicate 330 mimicking a structure and operation of the pre-driver2 (221; FIG. 5), a final-driver current regulation operational amplifier 334, and a pre-driver2 current regulation operational amplifier 335. The amplitude sensor 333 in FIG. 6 is operable to generate an accurate reference voltage for any fixed transmitter output amplitude with respect to the termination power supply VTT.

Circuit 332 (FIG. 6) is a scaled duplicate of the real transmitter termination resistor network 204 shown in FIG. 4, which has two modes of operation, an AC-coupled mode and a DC-coupled mode. When the logic signal ACEN input thereto is at a high level (enabled), transistor P13 is disabled and resistor R03 is active in series with resistors R23 and R33 to generate an accurate transmitter output low level for the AC-coupled mode. On contrary, when the logic signal ACEN is at a low level (disabled), transistor P13 is enabled to establish a conductive path jumping resistor R03. In this way, an accurate transmitter output low level is generated for the DC-coupled mode.

Circuit 331 (FIG. 6) is a modified duplicate of the final-driver 221 (FIG. 5), in which one leg of the loading impedance is replaced with a small leakage current 12 fed to the drain of transistor N23. Circuits 331, 332, 333 and 334 together form a current regulation feedback loop which regulate the tail current through transistor N53 to be just high enough to force the voltage at node TXNFB to be equal to the voltage TXN input thereto from amplitude sensor 333. The voltage reference TXN is the transmitter output amplitude with reference to VTT.

In operation, the voltage TXNFB is regulated to be at the desired transmitter output amplitude. Once the tail current through transistor N53 is established, the voltage at node CSDRV is established. Then, the voltage at node ZN is established at a voltage level which is just high enough for the small leakage current 12 to flow through transistor N23. The node voltage ZN is the desired pre-driver2 output amplitude information and is used as a reference voltage for the pre-driver2 tail current regulation feedback loop.

Similarly, the tail current through the transistor N43 is regulated to be just high enough to force the voltage at node ZNFB to be equal to the voltage at node ZN. Once the tail current through transistor N43 is established, the node OOB-CMV is the correct common mode voltage for the pre-driver2 because resistors R33 and R43 have equal resistances. The correct common mode voltage OOBCMV then is delivered to the real pre-driver2 (221; FIG. 5) in the high speed data path and can be activated for use during the OOB signaling operation mode. The tail bias voltage VBIASDRV is delivered to the real final-driver 222 (FIG. 5) in the high speed data path, as well as the tail bias voltage VBIASPRED delivered to the real pre-driver2 (221; FIG. 5) in the high speed data path.

Figure 7:
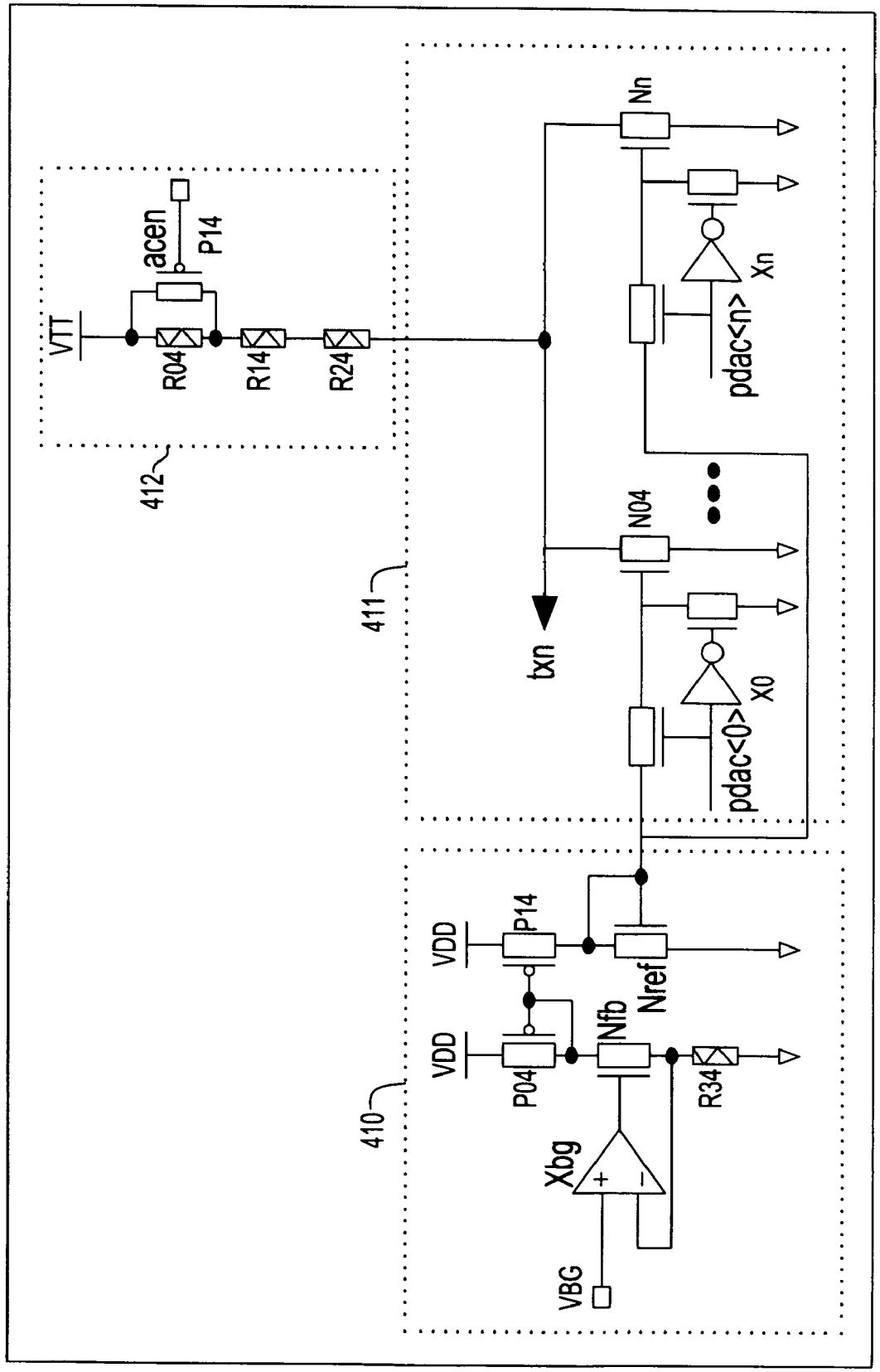
FIG. 7 is a schematic diagram illustrating a circuit-level implementation of an amplitude sensor circuit of a serial driver in accordance with an embodiment of the invention.

FIG. 7 is a schematic diagram illustrating an exemplary circuit 433 for implementing the transmitter output amplitude sensor 333 shown in FIG. 6. As shown therein, the amplitude sensor 333 includes a duplicate termination network 412 which mimics the structure and operation of the real termination network 204, its operation being the same as that described above for the duplicate termination network 332 (FIG. 6). The amplitude sensor also includes a band-gap reference voltage-based bias current unit 410, and an IDAC unit 411. Transistors N04 to Nn form the IDAC 411 which mimics the IDAC of the final-driver 222 (FIG. 5). The IDAC unit 411 is controlled by logic control signals PDAC<0:n>. Logic control signals PDAC<0:n> are customer-controlled register bits which control the output amplitude of the transmitter.

In operation, a bandgap voltage reference VBG input to the bias current unit 410 provides a stable reference voltage input to the IDAC unit 411. In turn, the logic control signals PDAC<0:n> input to the IDAC unit provide a transmitter output amplitude reference TXN which can also be adjusted up or down in accordance with whether the driver is to be operated in AC-coupled mode (ACEN being at a high level) or in DC-coupled mode when ACEN is set at a low level.

As apparent from the above-discussion, the performance of the serial driver at high speed can be enhanced because of the above-described improvements in the CML stages help the driver in the high speed data path to switch between levels at a better operating point.

The above-described embodiments of the invention include modified duplicate CML circuit stages mimicking the structure and operation of the real pre-driver1, pre-driver2 and final-driver stages. Each of the duplicate stages can have a structure very similar to the real CML stages of the high speed data path. These CML mimic stages are used to generate an appropriate amount of tail bias current for operating the real CML stages on the high speed data path. The CML mimic stages generate and modify a tail bias current in amounts appropriate for various transmitter output amplitude settings in accordance with customer register controls and which compensate for changes in the operation of the real CML stages due to variations in the fabrication process of the CML stages as well as variations in temperature, the power supply voltage or some combination of these factors. Once the tail bias currents are established for the real CML stages of the high speed data path, the correct long term common mode voltage is established for the pre-driver. In turn, the correct long term common mode voltage, also called the OOB signaling DC idle voltage level, is quickly established. The requirements of the SATA and SAS OOB signaling specifications can therefore be met by operation of the above-described serial driver circuitry. In particular, the above-described embodiments of the invention can meet the requirements of the SATA and SAS OOB specifications relating to OOB offset delta, OOB common mode voltage delta, and fast transition time from DC idle time to burst time and vice versa.

The above-described embodiments of the invention can prove useful for meeting the OOB signaling specifications in either the SATA and SAS serial bus protocol and any other serial bus protocol wherein the bus can lose synchronization or goes into sleep mode and needs to re-establish synchronization for active serial data communication.

Figure 8:
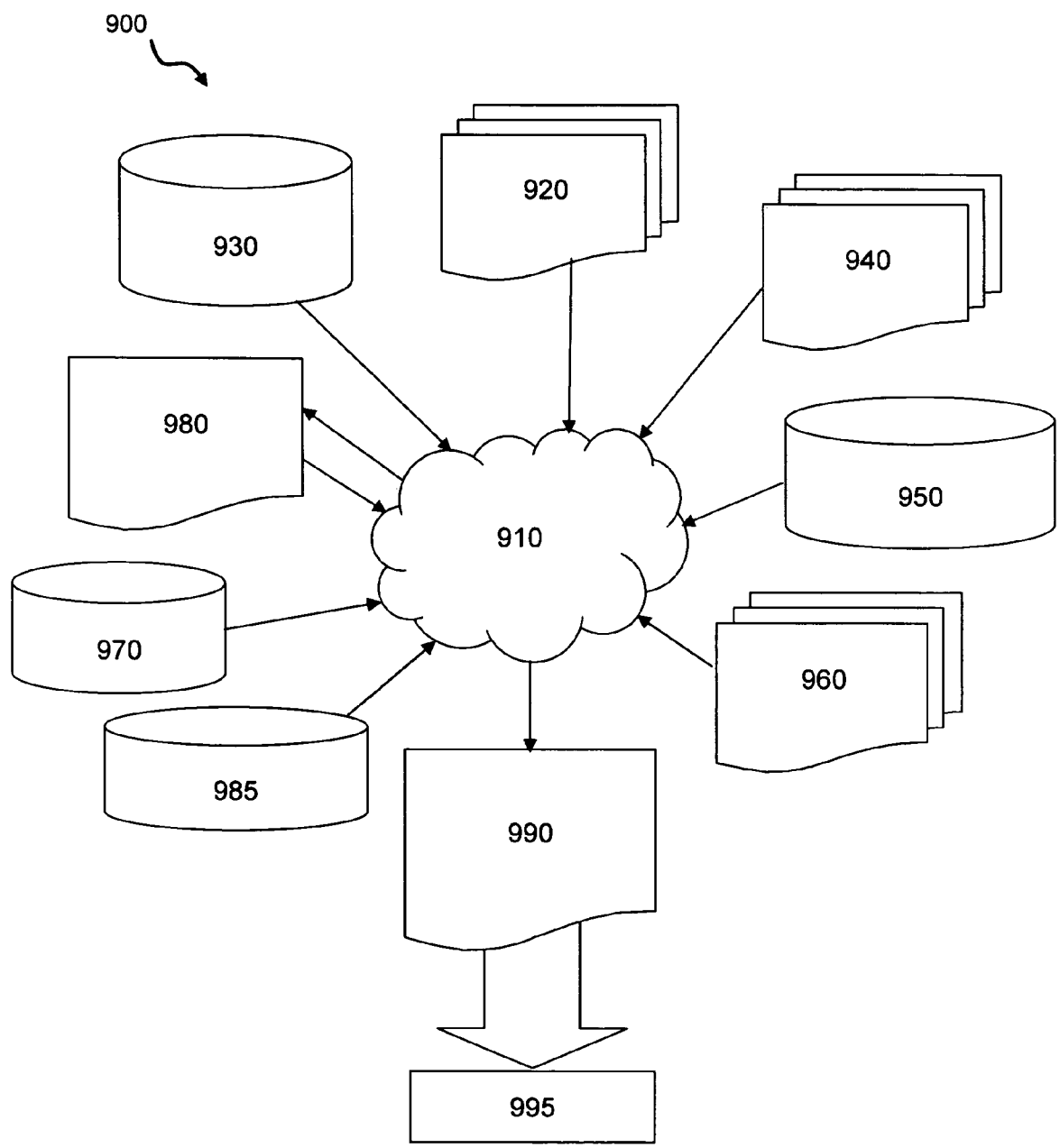
FIG. 8 is a flow diagram of a design process used in one or more of semiconductor design, manufacture, or test.

FIG. 8 shows a block diagram of an example design flow 900. Design flow 900 may vary depending on the type of IC being designed. For example, a design flow 900 for building an application specific IC (ASIC) may differ from a design flow 900 for designing a standard component. Design structure 920 is preferably an input to a design process 910 and may come from an IP provider, a core developer, or other design company or may be generated by the operator of the design flow, or from other sources. Design structure 920 can include a serial driver or microelectronic element for a serial driver, as shown, for example, in (FIGS. 4, 5, 6 or 7) in the form of schematics or HDL, a hardware-description language (e.g., Verilog, VHDL, C, etc.). Design structure 920 may be contained on one or more machine readable medium. For example, design structure 920 may be a text file or a graphical representation of the serial driver 200 such as that illustrated herein with respect to FIGS. 4, 5, 6 or 7. Design process 910 preferably synthesizes (or translates) the serial driver into a netlist 980, where netlist 980 is, for example, a list of wires, transistors, logic gates, control circuits, I/O, models, etc. that describes the connections to other elements and circuits in an integrated circuit design and recorded on at least one of machine readable medium. This may be an iterative process in which netlist 980 is resynthesized one or more times depending on design specifications and parameters for the circuit.

Design process 910 may include using a variety of inputs; for example, inputs from library elements 930 which may house a set of commonly used elements, circuits, and devices, including models, layouts, and symbolic representations, for a given manufacturing technology (e.g., different technology nodes, 32 nm, 45 nm, 90 nm, etc.), design specifications 940, characterization data 950, verification data 960, design rules 970, and test data files 985 (which may include test patterns and other testing information). Design process 910 may further include, for example, standard circuit design processes such as timing analysis, verification, design rule checking, place and route operations, etc. One of ordinary skill in the art of integrated circuit design can appreciate the extent of possible electronic design automation tools and applications used in design process 910 without deviating from the scope and spirit of the invention. The design structure of the invention is not limited to any specific design flow.

Design process 910 preferably translates an embodiment of the invention as described herein with respect to FIGS. 4, 5, 6 or 7, along with any additional integrated circuit design or data (if applicable), into a second design structure 990. Design structure 990 resides on a storage medium in a data format used for the exchange of layout data of integrated circuits (e.g. information stored in a GDSII (GDS2), GL1, OASIS, or any other suitable format for storing such design structures). Design structure 990 may comprise information such as, for example, test data files, design content files, manufacturing data, layout parameters, wires, levels of metal, vias, shapes, data for routing through the manufacturing line, and any other data required by a semiconductor manufacturer to produce an embodiment of the invention as depicted herein with respect to FIGS. 4, 5, 6 or 7. Design structure 990 may then proceed to a stage 995 where, for example, design structure 990: proceeds to tape-out, is released to manufacturing, is released to a mask house, is sent to another design house, is sent back to the customer, etc.

While the invention has been described in accordance with certain preferred embodiments thereof, many modifications and enhancements can be made thereto without departing from the true scope and spirit of the invention, which is limited only by the claims appended below.

What is claimed is:

1. A design structure embodied in a non-transitory machine readable medium, the design structure comprising a serial driver that operates to transmit a differential signal during an out of band ("OOB") burst interval and a predetermined common mode voltage level during an OOB idle interval between two adjacent OOB burst intervals, the serial driver including at least one pre-driver and a driver coupled to an output of the pre-driver for transmitting the differential signal, the design structure further comprising a switching circuit and a finite impulse response ("FIR") filter, wherein the switching circuit switches the serial driver to OOB operation without requiring settings of the FIR filter to change before beginning OOB operation.

2. The design structure as claimed in claim 1, wherein the design structure comprises a netlist.

3. The design structure as claimed in claim 1, wherein the design structure resides on a storage medium as a data format used for an exchange of layout data of integrated circuits.

4. A design structure as claimed in claim 1, wherein the predetermined common mode voltage level is independent of manufacturing variations in a process of fabricating a microelectronic element.

5. A design structure as claimed in claim 1, wherein the switching circuit operates to switch the serial driver directly from transmitting data at a peak data transmission rate to OOB operation for transmitting OOB signals defined by the OOB burst interval and the OOB idle interval.

6. A design structure embodied in a non-transitory machine readable medium, the design structure including a serial driver that operates to transmit during an out of band ("OOB") signal burst interval and to output a predetermined common mode voltage during an OOB idle interval between two adjacent OOB burst intervals, the serial driver including at least one pre-driver and a driver coupled to outputs of the pre-driver for driving a serial differential signal, the design structure further including a switching circuit that operates to switch a power supply voltage to the serial driver to the predetermined common mode voltage in response to an out of band signaling enable input.

7. The design structure as claimed in claim 6, wherein the design structure comprises a netlist.

8. The design structure as claimed in claim 6, wherein the design structure resides on a storage medium as a data format used for an exchange of layout data of integrated circuits.

9. A design structure as claimed in claim 6, wherein the common mode voltage generator includes a bandgap voltage generator that operates to generate a voltage independent of power supply voltage conditions and temperature.

10. A design structure as claimed in claim 6, wherein the predetermined common mode voltage is a first predetermined common mode voltage and the common mode voltage generator further includes a circuit that operates in response to an AC enable signal to generate a second predetermined common mode voltage for AC coupled operation having a value different from the first predetermined common mode voltage.

11. A design structure as claimed in claim 6, wherein the common mode voltage generator operates to remain turned on throughout the OOB burst interval and the OOB idle interval.

12. A design structure as claimed in claim 6, wherein the switching circuit operates to disable operation of the serial driver during the OOB idle interval.

13. A design structure as claimed in claim 6, wherein the serial driver operates to transmit serial data from a beginning of the OOB burst interval.

14. A design structure as claimed in claim 6, wherein the common mode voltage generator operates to generate the predetermined common mode voltage at a level selected in accordance with a plurality of input signals.

15. A design structure as claimed in claim 14, wherein the common mode voltage generator includes a digital to analog current converter ("IDAC") that operates to generate the predetermined common mode voltage at the selected level.

* * * * *